Oct. 14, 1952 L. S. COOPER 2,614,059
METHOD OF MAKING RADAR DOMES
Original Filed May 6, 1949
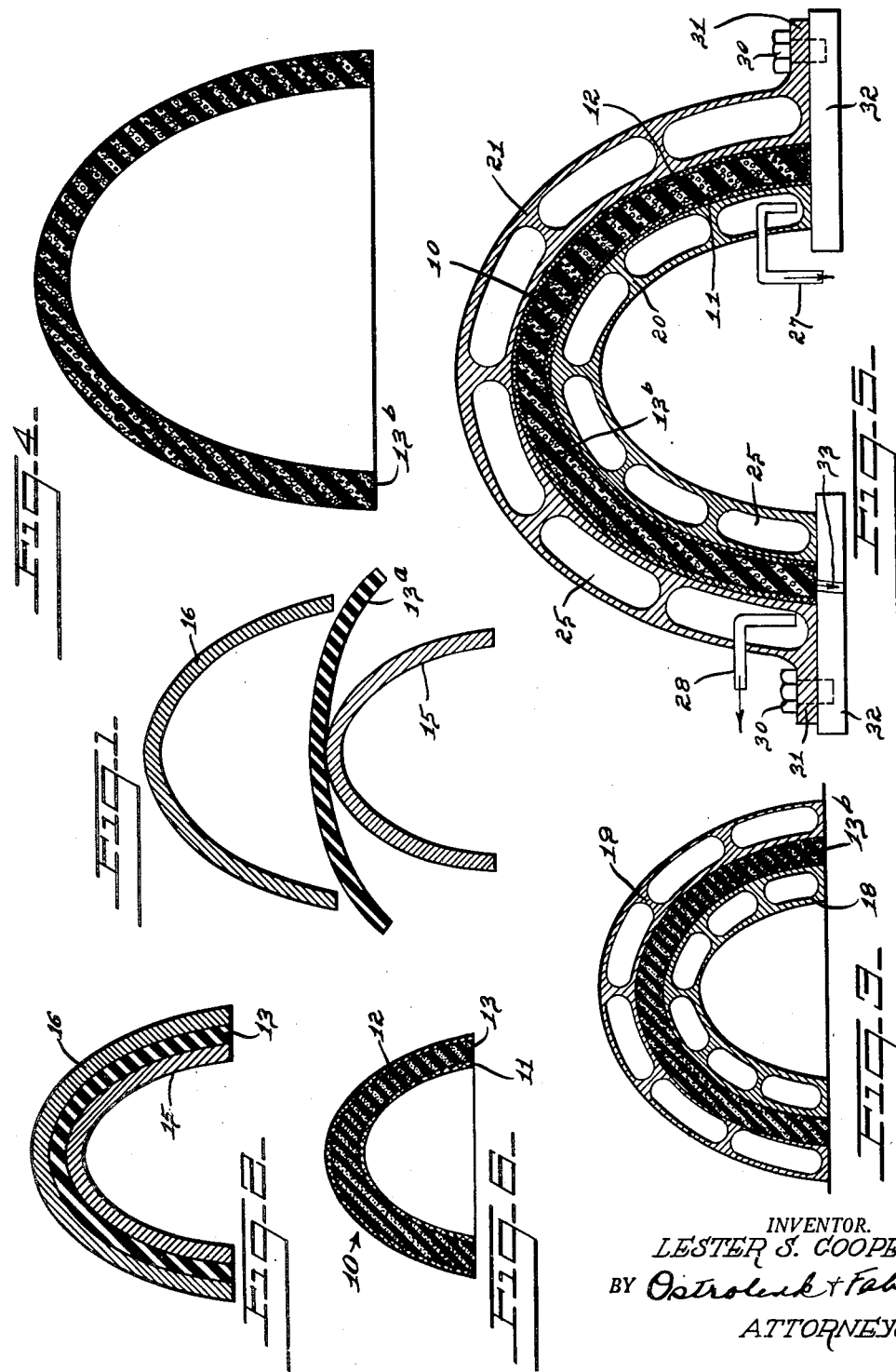
INVENTOR.
LESTER S. COOPER
BY Ostrolenk + Faber
ATTORNEYS Patented Oct. 14, 1952

2,614,059

UNITED STATES PATENT OFFICE 2,614,059

METHOD OF MAKING RADAR DOMES

Lester S. Cooper, Columbia, Conn., assignor to Rubatex Products, Inc., New York, N. Y., a corporation of Delaware Original application May 6, 1949, Serial No. 91,676. Divided and this application January 3, 1951, Serial No. 204,211

1 Claim. (Cl. 154—110)

My present invention is a division of my application Serial No. 91,676 filed May 6, 1949 and relates to protective devices, housings, or shields of high permeability to radio frequencies particularly in the ultra-high frequency range and more particularly to a protective unit adapted to enclose and streamline a radar antenna mounted in a moving vehicle such as aircraft.

Expanded closed cell cellular rubber commonly known as Rubatex has a dielectric factor closely approximating that of air and is thus highly permeable to radio frequencies and, therefore, will not interfere with the transmission or reception of radar signals.

Heretofore in the manufacture of radar domes which were usually spheroidal in shape (being either semi-spherical or projectile shaped depending on the location in the aircraft) attempts were made to secure an efficient protective dome structure by making the dome of a plurality of gores cemented together.

It was found, however, that the cement lines interfered with the transmission and reception of the radar signals.

A radar dome is particularly necessary on aircraft as a protection against the vibration and mechanical stress on delicate antennae owing to aerodynamic forces, as well as owing to airborne objects of various kinds found in the atmosphere.

In addition, where the radar antenna is mounted on the underside of the fuselage, the radar dome is necessary to protect the antenna against stones and dirt which may be thrown up by the airplane wheels while taxiing, landing, or taking off.

Accordingly, the radar dome must be rigid and strong while at the same time it must be substantially transparent to radio frequencies.

The rigidity and strength is obtained by the utilization of hard expanded closed cell rubber formed in accordance with the method disclosed in Patents Nos. Re. 21,245, 2,299,593, and 2,268,621 and formed with sufficient sulphur so that when vulcanized a hard board will result.

The dome is sandwiched between fibre glass sheets impregnated with an alkyd resin to form a rigid structure having the high permeability above noted.

When, however, the board was formed from gores cemented together, the high permeability of the structure as a whole was nullified when any particular radar signal was required to pass through one of the glue lines. False reflections and signals occurred and at times the signal was absorbed.

In addition, while it was desirable that the signal be generated from a point at the center of the dome, the various shapes required of the dome made it necessary for the signal to traverse the material of the dome at different angles for different positions of the antenna varying the thickness of the material traversed.

The object of my invention is the formation of a unitary dome structure of hard closed cell expanded cellular material wherein the material is homogeneous and continuous throughout without any glue lines.

An additional object of my invention is the formation of the dome as above set forth in a sandwich construction between fibre glass sheets wherein the single homogeneous dome is securely integrated with the fibre glass sheets and wherein the entire structure is formed and shaped and brought to final completion in a mold.

The molding of the entire dome makes is possible to vary the thicknesses at different areas of the dome so that where the dome is used as a radar dome the variations in thickness of the dome will ensure that for every angular position of the radar antenna the signal will be required to traverse an equal thickness of the dome.

The foregoing and many other objects of my invention will become apparent in the following description and drawings in which:

Figure 1 is a schematic view in cross-section showing a piece of solid rubber intended to form the core of my novel dome prepared for molding to the preliminary shape.

Figure 2 is a schematic view in cross-section showing the solid rubber molded to the preliminary shape.

Figure 3 is a schematic view in cross-section showing the pre-molded solid rubber placed in a second mold and blown to the precured stage described in the above-mentioned patents.

Figure 4 is a cross-sectional view through the precured stage of the dome as it is removed from the mold of Figure 3 in frozen condition.

Figure 5 is a schematic view in cross-section showing the precured dome of Figure 4 placed in the final mold between sheets of fibre glass to be blown to the final shape.

Figure 6 is a cross-sectional view through the completed dome.

Referring now to the figures, the dome 10 is composed of an inner skin 11 and an outer skin 12 of a combination of glass fabric thermoplast and a core 13 of hard closed cell cellular rubber. The rubber compound must not contain anything deleterious such as metal contamination, carbon, etc.

Generally, the distance of separation of inner and outer skin is approximately one half inch more or less but may vary in the same dome at different portions of the dome curve due to complications of tangential exit and entry of the electromagnetic radar impulses.

In order to satisfy the dielectric uniformity of the cellular rubber component of the sandwich construction, it is important that all rubber gas cells be of the same size throughout, that there be no voids or breaks or glue joints and that the rubber core have a uniform density throughout. Only then can the strict dielectric specifications be realized.

Heretofore the cellular rubber sheet was cut into gores which were assembled to the required shape by gluing and then the whole was glued into two glass plastic skins. The rubber sheet itself had a tough skin on both surfaces.

The difficulty was that the radar signal suffered distortion by the glue joints which acted opaque and the more so as the signal had to pass through complicated patterns tangentially. The rubber skin in a general manner reduced efficiency. The gluing had to be accepted for want of something better.

On the whole, a good balance can be found for physical strength and dielectric effect with a glass plastic rubber sandwich because the cellular rubber mentioned has:

(a) A low dielectric factor,
(b) Low loss tangent,
(c) Is of low density, 8 pounds per cubic foot being used,
(d) Is ideal for sandwiching,
(e) Low water absorption which is of value if outer glass skin is damaged,
(f) Good processability.

The deleterious effects of gore glue joints and gluing to the glass skins as well as the rubber skins are done away with in my novel dome.

The process consists of the following steps:

1. Pre-shaping the rubber dough into a dome-shaped solid rubber core of one-half linear dimensions (Figures 1 and 2), 2. Precuring the dome-shaped solid rubber core in a miniature mold of essentially the dimensions and shape of the rubber core of step 1 (Figure 3), 3. Expanding the precured miniature rubber core to slightly less than the glass dome size (Figure 4), 4. Freezing the expanded rubber dome, if necessary, to the point of crystallization.

5. Skinning the inner and outer surfaces of the hardened rubber dome (by chilling) with a suitable knife or scraper to provide an open cell surface suitable to adjoin the glass skins.

6. Installing this preparation within the two glass skins. The precured and skinned rubber core at this stage of the process does not completely fill the inner space of the glass skins but is allowed further expansion.

7. Installing this unit within a mold to be steam heated, subsequently, for complete vulcanization of the rubber core. This mold closely fits the dome-shaped shield. Mounting this filled mold upon a base plate (Figure 5), 8. Evacuating the remaining space (to be fully filled by the rubber core) through the base plate (Figure 5).

9. Heating the rubber core through the glass skins to a final hard rubber vulcanizate. Additional evacuation is employed to remove $H_2S$ gas forming and to remove any air bells from within the sandwich and, furthermore, to force the rubber against the glass skins by virtue of increased internal rubber cell pressure.

In step 1 the molded solid rubber core is, after cooling, diminished at the edge approximately five per cent of its weight in order to provide space for thermal expansion of the rubber solid during the precuring period.

In step 2 the confined blowing agent gradually reaches a gas pressure of 1,500 pounds p. s. i. in consequence of which the gas causes an "internal gassing" of the rubber. The final gas cells are actually much smaller than the particle size of the chemical blowing agent admixed to the rubber.

A refinement consists in cooling down the hot precure within the blowing mold before expansion in order to avoid diffusion of the hot gas from the outer layers of the cell rubber and thereby building up a heavy, tough rubber skin. This gives a product of less density than can be had without cooling.

After the cell rubber has regained its physical strength, it is carefully expanded by heat to a predetermined size and refrigerated as pointed out.

In step 5 care must be taken to avoid any damage to the open cell surface by a dull knife and laying down the cell walls. By moving the knife obliquely or by reciprocating motion and using water freely as lubricant, a satisfactory skinning operation is possible. The knife for outside use is concave, while the knife for inner use has a convex bend.

The freezing of step 4 not only controlled expansion but also provided the necessary consistency of the cell rubber to be successfully skinned.

In step 8 the evacuation is performed before steam is admitted to the jackets of the mold and while the rubber core is still cold and unyielding allowing a complete evacuation of the remaining air space and creating vacuum cups out of the open surface cells.

During step 9, the final step, the cell rubber is not only hard vulcanized but the glass plastic mantles being thermo-plastic soften up and liberate alkyd resins which are instrumental in integrating glass plastics and rubber. The open cells are, as it were, sucked against the fabric surfaces by virtue of the vacuum.

Referring again to the drawings, a solid rubber sheet 13a which has been mixed with the appropriate amount of sulphur for securing a hard vulcanization and the appropriate amount of chemical material for securing an appropriate blow or expansion in accordance with the expansion of the showing of the above patents is placed over the mold core 15 (Figure 1) and the mold shell 16 is pressed down thereon as shown in Figure 2.

If necessary, sufficient heat is applied to plasticize the rubber enough to permit the formation of Figure 2 to be obtained and retained by the rubber without causing a blow to occur. Since the rubber 13a is in unvulcanized condition, the plasticizing heat will not ordinarily be necessary.

The pre-formed rubber sheet 13a of Figure 2 is then removed from the mold of Figure 2 and placed over the steam heated core 18 as shown in Figure 3.

A steam heated shell 19 is placed over the preformed unvulcanized rubber sheet. The spacing between core 18 and shell 19 is somewhat greater than the spacing between core 15 and shell 16 to permit some expansion of the rubber.

The mold 18—19 is now heated to a degree sufficient to cause partial vulcanization of the rubber and a partial decomposition of the crude chemical material to produce a partial blow so that the rubber material 13b in the mold 18—19 is expanded to the precure stage.

If it were removed from the mold 18—19 at this time without any preliminary operation, it would then expand further diminishing or precluding any possibility of further working thereof.

However, mold 18—19 is now chilled to a point where the rubber is almost crystalline in form and thus cannot be expanded. The chilled precured core 13b is now removed from the mold 18—19.

The precured core 13b of Figure 4 is then subjected to a cutting operation with a sharp blade which will remove the outer skin formed by the collapse of the cells adjacent the mold walls so that a plurality of minute cups are formed in the inner and outer surface of the core 13b.

A sheet of fibre glass 11 impregnated with an alkyd resin is then placed over core 20 of the mold of Figure 5. The refrigerated core 13b is placed thereover. A second sheet of fibre glass 10 impregnated with an alkyd resin is placed over the core 13b and the shell 21 of the mold 20 is placed over the fibre glass sheet 10.

The spacing between core 20 and shell 21 is slightly greater than the original thickness of the chilled core 13b and the sheets 10 and 11.

Appropriate tubes, openings, or recesses 25 are provided in core 20 and shell 21 for the admission of steam and appropriate conduits 27, 28 are provided for exhaust of condensed moisture or of steam.

The shell 21 is secured by means of bolts 30 through lugs 31 to base plate 32 which is an annular base plate carrying the core 20. One or more openings 33 are provided in base plate 32 communicating with the space between shell 21 and core 20, the said openings 33 being connected to a vacuum pump.

Air is first exhausted from the space between shell 21 and core 20 so that the open cells at the surfaces of the rubber core 13b will constitute vacuum cups. After the air is exhausted, heat is applied by means of steam through passages 25 in mold 20—21 to fully vulcanize the rubber core 13 and expand the same into close and intimate contact with the impregnated fibre glass sheets 10 and 11.

The internal pressure forces the multiplicity of open minute cells in the skin of the core into vacuum cup type engagement with the glass sheets, while the alkyd resins liberated by the heat serve to integrate the rubber and glass fibre sheets at their meeting surfaces.

After expansion and final vulcanization, the shell 21 may be removed and the completed dome is then available for operation.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

The method of forming a compound curved radar shield having a core of continuous homogeneous closed cell expanded sheet material confined between an outer layer and an inner layer of fibre glass sheet material impregnated with an alkyd resin comprising the steps of forming an unvulcanized rubber mix into the compound curve; partially expanding and partially vulcanizing the rubber mix; chilling the partially expanded and vulcanized mix; cutting the surface skin from the partially cured rubber; placing the partially cured rubber between fibre glass sheets, formed into said compound curve evacuating air from between the rubber and the fibre glass sheets; heating the compound unit and fully expanding the rubber into intimate contact with the fibre glass sheets, and softening the alkyd resin and integrating the rubber and fibre glass at their meeting surface.

LESTER S. COOPER.

REFERENCES CITED

The following references are of record in the file of this patent:

UNITED STATES PATENTS

| Number | Name | Date |
| --- | --- | --- |
| 2,247,337 | Raflovich | June 24, 1941 |
| 2,414,125 | Rheinfrank | Jan. 14, 1947 |